Patented Jan. 6, 1948

2,433,850

UNITED STATES PATENT OFFICE 2,433,850

ICE-CREAM MIX

Abraham Leviton, Washington, D. C.; dedicated to the free use of the People in the territory of the United States No Drawing. Application June 22, 1943, Serial No. 491,773

4 Claims. (Cl. 99—136)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

Reference is made to copending application, Serial No. 480,951, filed March 29, 1943, dealing with the absorption of riboflavin by lactose and which has matured into Patent No. 2,413,055 of December 24, 1946.

This invention relates to milk products, such as ice cream, condensed milk, and so forth, containing lactose in excess of the amount required for saturation.

In the manufacture of such products as ice cream and sweetened condensed milk, a defect, due to crystallization of lactose, known as "sandiness," is apt to develop. Sandiness arises when the concentration of lactose exceeds that required to produce a saturated solution. However, the excess quantity of lactose (the degree of supersaturation) must exceed a well-defined minimum quantity before crystallization ensues spontaneously, that is, ensues without the introduction of nuclei as the result of seeding, or of mechanical or thermal treatment, and varies with such factors as temperature, viscosity, and the composition of the solution or mixture from which the lactose crystallizes. In case of non-spontaneous crystallization, the mechanical and thermal treatments to which the lactose-containing solution or mixture is subjected are also variable factors. Stirring, scratching of the walls of the containing vessel, local supercooling, and heat shocking are treatments which serve to decrease the degree of supersaturation necessary to effect crystallization.

Lactose will crystallize out of a supersaturated solution if the solution is seeded with lactose crystals or with crystals isomorphous to lactose. When so seeded, the onset of crystallization ensues when the concentration of lactose just exceeds that of saturation. Following the onset of crystallization, lactose separates at a rate determined by a number of factors, including the extent of seeding, the degree of supersaturation, the temperature, the agitation, and the presence of specific foreign substances.

The forms of lactose crystals commonly found in such products as ice cream and sweetened condensed milk are either typical, having trapezoidal side faces and beveled rhombic tops and bottoms, or atypical, having truncated pyramidal faces with flat rhomboid bases and apices. These forms, because the crystals are well developed in all three dimensions, impart the taste sensation of sandiness, unless the growth of the crystals has not progressed to such extent that the normal crystals exceed a maximum permissible dimension of approximately 0.01 mm. in length.

To avoid the defect of sandiness according to prior art processes, a number of methods are employed.

In the manufacture of ice cream, for example, serum solids with water are employed in the mix, the usual amount of water being about 64 percent. Under severe conditions of storage, that is, conditions which are conducive to rapid onset of crystallization and of crystal growth, the maximum amount of serum solids which can be used in such a mix without producing sandiness is about 10 percent, containing 55 percent lactose, and under mild storage conditions, the amount of such solids may be increased to about 11.8 percent. If it be desired to increase the amount of serum solids in the mix, say to about 14 percent or 15 percent, sandiness results even under mild conditions of storage.

This limitation in the percentage of serum solids which may safely be employed handicaps the manufacturer in the production of ice cream having certain desired properties derived from an increased amount of serum solids. These properties are obtained at the present time by adding "de-lactosed" serum solids, that is, solids in which the lactose has been wholly or partly removed, or by adding certain other products, such as sodium caseinate, to the normal mix. Apart from the cost consideration, the use of these products is objectionable, since undesirable off-flavors are introduced.

In the preparation of sweetened condensed milk, following the step of concentration, the milk may be supercooled to a temperature at which, when seed crystals are added, the lactose will crystallize around a large number of nuclei, resulting in the formation of small crystals, and the product, although slightly sandy, is palatable. This method requires close control of the degree of supercooling, of the concentration of milk solids, and of the viscosity and composition of the concentrate. Agitation following cooling is required. This method is complicated and not always effective, since a common occurrence of the defect in condensed milk is "sanding out" (settling out of lactose crystals), a phenomenon arising out of the presence of lactose crystals exceeding the maximum permissible dimension mentioned above.

This invention obviates the defects of the prior art processes indicated above, and has as its primary object the treatment of milk products subject to sandiness in a manner resulting in retardation of the onset and rate of crystallization of the lactose and, when crystallization does take place, in such modification of the crystalline structure that the taste sensation of sandiness is avoided.

Other objects include the production of milk products having an increased concentration of lactose over the concentration normal to the product without crystallization of the lactose in a manner objectionable to the taste, having an added riboflavin content, wherein the riboflavin also acts to modify the crystallization habits of the lactose, and such other objects as will be apparent from the following description and appended claims, all of the objects being obtained in a simple manner.

The invention rests on the discovery, when lactose crystallizes in the presence of riboflavin (vitamin $B_2$), that the onset and rate of crystallization are retarded, phenomena which are manifested under certain conditions of "relative concentration," and that the structure of the lactose crystals is modified from the characteristic tomahawk to a thin, platy form, phenomenon which manifests itself at a somewhat higher "relative concentration." Crystals of the latter form, even when comparatively large, do not produce the taste sensation of sandiness. The form in which the modified crystals separate does not represent a transitional form in the growth of normal crystals, but rather a form in which the lactose crystals exist in equilibrium with their saturated mother liquor.

By "relative concentration", as herein used, is meant that ratio, $R/L$, where $R$ represents the quantity by weight of riboflavin in a given quantity of water and $L$ the quantity by weight of lactose in excess of the quantity required to saturate the quantity of water at the temperature of storage.

The conditions under which the spontaneous onset and rate of crystallization are greatly decreased, and in which the structures of the lactose crystals, when formed, are modified, depend on the concentration of the lactose in the solution, the greater quantity of lactose supersaturation requiring the greater quantity of riboflavin. For example, a lactose solution having a 5 g. supersaturation for 100 g. of water with about 2.5 mg. of riboflavin ("relative concentration" about 0.0005) is satisfactory to give substantially a complete modification of the crystalline structure, whereas a solution under corresponding conditions, except with a 25 g. lactose supersaturation, with about 10 mg. of riboflavin ("relative concentration" about 0.0004) is satisfactory.

The above illustrations are for conditions of spontaneous crystallization. In the case of agitation, as is more usual, a lower "relative concentration" may be used. For example, an excess lactose of 13 g. per 100 g. of water requires about 2.5 mg. of riboflavin ("relative concentration" about 0.00019), and a solution under corresponding conditions, except having an excess of 25 g. of lactose, requires about 6 mg. of riboflavin ("relative concentration" of about 0.00025).

The "relative concentrations" above mentioned are those which obtain with aqueous solutions of lactose, and with lactose-containing solutions derived from milk serum. In the case of products formed with milk or solutions of milk serum, the quantity of water is taken as the quantity present in the particular milk or milk serum product under consideration. In ice cream, for example, it is the quantity of unfrozen water present in the ice cream under normal conditions of storage. Since many variable factors affect the results, and since the transitional point from unmodified to modified crystalline structures is not well defined, the minimum "relative concentration" is not sharply specified. However, the values indicated above are those near the minimum for giving a preponderance of modified crystals, at least sufficient to avoid sandiness. An excess of riboflavin may, of course, be used.

The manner in which the discoveries above described may be applied to overcome the defect of sandiness in ice cream and in sweetened condensed milk is exhibited in the following examples:

*Example I*

In the manufacture of ice cream, a usual low butterfat formula includes 15 percent serum solids and 64 percent water, with a customary amount of sugar (about 13 percent) and about 8 percent butterfat, which, unless special precautions are taken, is subject to sandiness, even under mild conditions of storage. The lactose concentration in such a mix averages about 13 g. per 100 g. of water. Under normal temperatures of storage, approximately 60 percent of the water is frozen to ice, resulting in a concentration of 32 g. of lactose per 100 g. of unfrozen water, giving a lactose supersaturation of about 24 g. Such a mix also contains approximately 0.5 mg. of riboflavin per 100 g. of water. If 3.5 mg. of riboflavin per 100 g. of water is added to the mix, giving a total of 4.0 mg. of riboflavin per 100 g. of water, the resulting ice cream contains approximately 10 mg. of riboflavin to 100 g. of unfrozen water, a sufficient quantity to avoid the defect.

*Example II*

Ordinary sweetened condensed milk contains an average concentration of about 32 g. of lactose per 100 g. of water, representing a supersaturation with respect to lactose varying between 22 g. at 0° C. and 7 g. at 30° C. In addition, the same quantity of such milk contains about 1.6 mg. of riboflavin. If not less than 4.8 mg. of riboflavin is added per pound of uncondensed milk, a resulting condensed milk product containing not less than 10 mg. of riboflavin per 100 g. of water is obtained. Lactose separates from this milk product at an exceedingly slow rate in the form of thin trapezoidal plates, as a consequence of which the defect of sandiness due to unmodified lactose crystals is avoided.

The quantity of riboflavin added is about the minimum required to avoid sandiness, allowing for normal variation in the composition of the milk and conditions of storage. However, considerably smaller quantities of riboflavin suffice to avoid the defect, if the temperature of storage is not so low.

In addition to the fact that sandiness is avoided, the process of this invention enriches the treated product with a vitamin indispensable to proper nutrition. The cost due to the process is determined solely by the cost of the vitamin, and the value of the treated product is enhanced to the same degree as the cost is increased. The process also provides for wide latitude in the use of milk serum solids.

Having thus described the invention, what is claimed is:

1. A low butterfat ice cream mix having a lactose concentration of about 13 g. and a riboflavin concentration of about 4 mg. per 100 g. of water.

2. Low butterfat ice cream having a lactose supersaturation of about 24 g. per 100 g. of unfrozen water at storage temperature and a riboflavin concentration of about 10 mg. per 100 g. of unfrozen water.

3. A low butterfat ice cream mix comprising about 15 percent serum solids and 64 percent water, said mix containing about 13 g. of lactose and 0.5 mg. of riboflavin derived from the serum solids per 100 g. of water and containing not less than about 3.5 mg. of added riboflavin per 100 g. of water, whereby lactose crystals which crystallize in the ice cream made from the mix under conditions of storage are so modified that sandiness is avoided.

4. Low butterfat ice cream containing lactose and riboflavin in an amount sufficient to give a "relative concentration" of not less than about 0.00019, whereby lactose crystals which crystallize in the ice cream under conditions of storage are so modified that sandiness is avoided.

ABRAHAM LEVITON.

REFERENCES CITED

The following references are of record in the file of this patent:

UNITED STATES PATENTS

| Number | Name | Date |
|---|---|---|
| 1,540,883 | Harris | June 9, 1925 |
| 2,006,699 | Supplee et al. | July 2, 1935 |
| 2,052,218 | Dickens | Aug. 25, 1936 |

OTHER REFERENCES

O. F. Hunzicker, "Condensed Milk and Milk Powder," IV ed., 1926, published by author, La Grange, Ill.

A. Leviton et al., "Separation of Lactose and Soluble Proteins of Whey by Alcohol Extraction," Chemistry, vol. 30, Nov. 18, 1938.

A. Leviton, "Absorption of Riboflavin by Lactose," Journal of Ind. and Eng. Chemistry, vol. 35, No. 5, May 1943.